United States Patent [19]

Bargfrede et al.

[11] Patent Number: 5,191,951
[45] Date of Patent: Mar. 9, 1993

[54] BELTED UNDERCARRIAGE ASSEMBLY

[75] Inventors: Brent C. Bargfrede, Dunlap; Carl W. Carter; James G. Neal, both of Peoria; Robert J. Purcell, Washington, all of Ill.

[73] Assignee: Caterpillar Inc., Peoria, Ill.

[21] Appl. No.: 752,811

[22] Filed: Aug. 30, 1991

[51] Int. Cl.⁵ .............................................. B62D 55/30
[52] U.S. Cl. ..................................... 180/9.1; 280/28.5; 305/29
[58] Field of Search .............................. 180/9.1, 9.48; 280/28.5; 305/47, 29, 32

[56] References Cited

U.S. PATENT DOCUMENTS

| | | | |
|---|---|---|---|
| 1,398,382 | 11/1921 | Lambert et al. | |
| 1,487,751 | 3/1924 | Miller | |
| 2,468,957 | 5/1949 | Burks | 305/29 X |
| 2,998,998 | 9/1961 | Hyler et al. | 180/9.1 X |
| 3,170,531 | 2/1965 | Katzenberger | 180/9.2 |
| 3,597,017 | 8/1971 | Tanaka | 305/32 |
| 3,620,318 | 11/1971 | Gostomski | 180/9.1 |
| 3,671,051 | 6/1972 | Werft | 280/28.5 X |
| 3,758,169 | 9/1973 | Trapp | 305/32 |
| 3,930,553 | 1/1976 | Kopera et al. | 180/9.28 |
| 4,221,272 | 9/1980 | Kell | 180/190 |
| 4,230,199 | 10/1980 | Stedman | 180/9.1 |
| 4,650,259 | 3/1987 | Alexander et al. | 305/10 |
| 4,923,257 | 5/1990 | Purcell | 305/29 |
| 5,127,714 | 7/1992 | Satzler | 305/60 |

FOREIGN PATENT DOCUMENTS 0085766  5/1983  Japan ........................ 305/47

Primary Examiner—Margaret A. Focarino
Assistant Examiner—C. Mattix
Attorney, Agent, or Firm—Claude F. White

[57] ABSTRACT

A belted undercarriage assembly for a vehicle, such as a non-powered towed trailer, includes first and second endless belt assemblies, one positioned on each side of the vehicle, first and second wheel supporting frame assemblies associated respectively with the first and second belt assemblies, and a supporting axle connected to each of the frame assemblies and to the vehicle. Each of the frame assemblies includes first and second rectangular shaped tubes which are adapted to telescope together. A first threaded adjusting mechanism controls the telescopic relationship of the first and second tubes and a second threaded adjusting mechanism controls lateral movement of the first tube relative to the second tube. Providing proper belt tension and alignment of the belt on the guide wheels are important to efficient and economical operation of a belted undercarriage assembly. If proper tension is not maintained, or if the belt drifts to one side or the other, undesirable heat buildup and wear are produced. The subject belted undercarriage incorporates simple and economical apparatus and methods for controlling the tension and lateral movement of the belt.

15 Claims, 3 Drawing Sheets

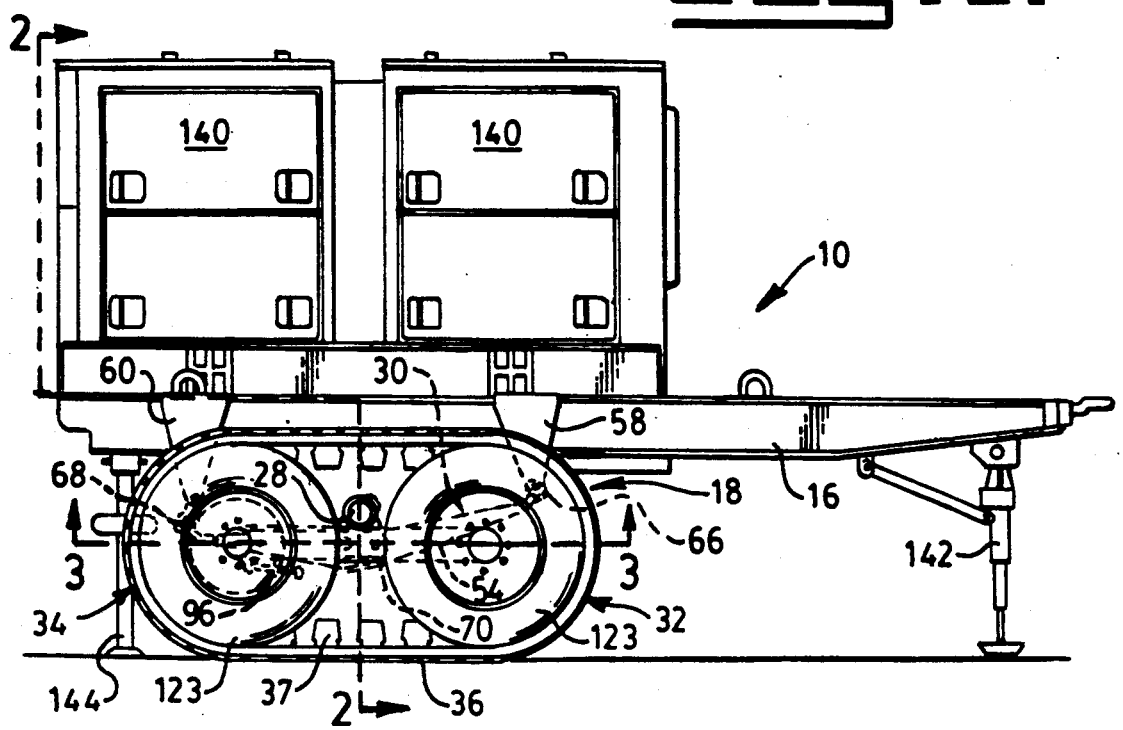
Fig_1.
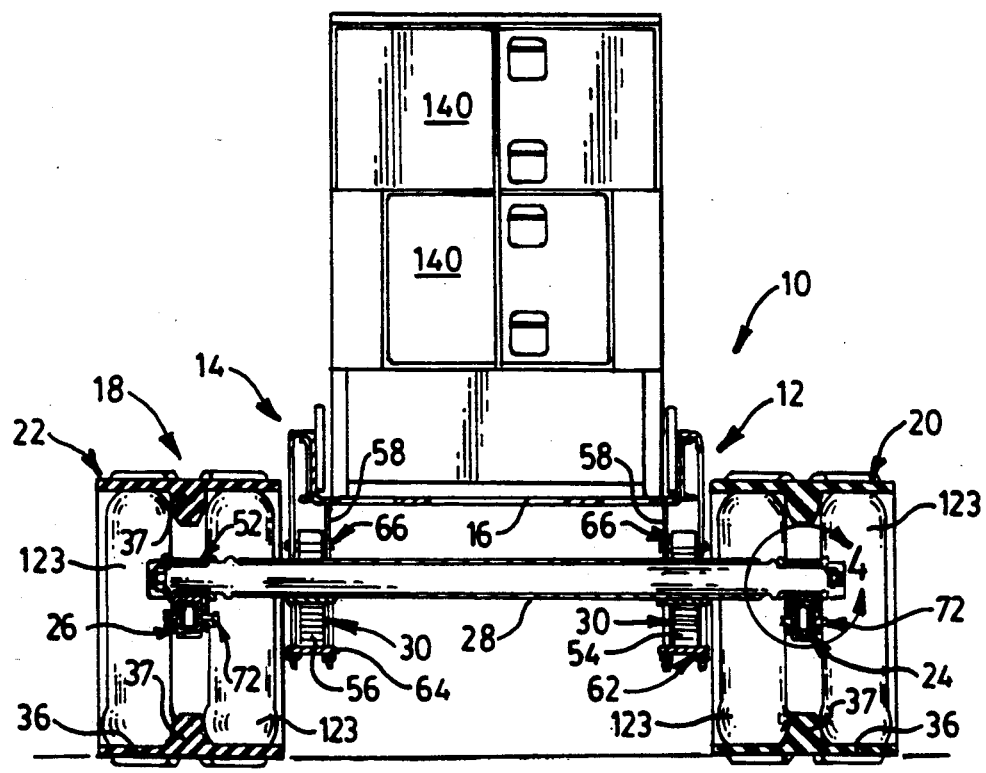
Fig_2.

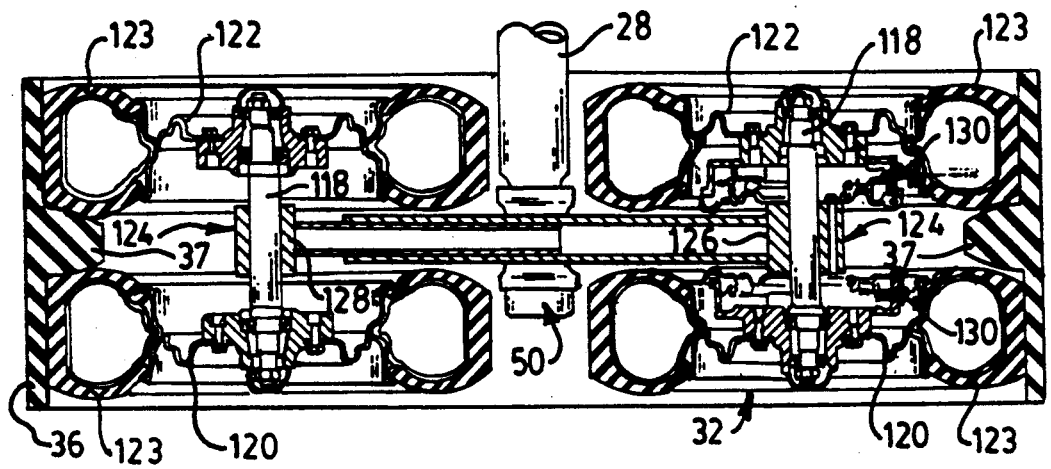
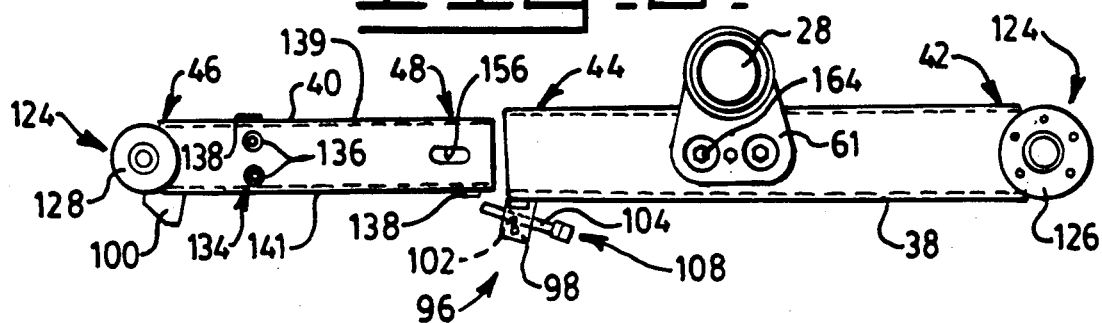
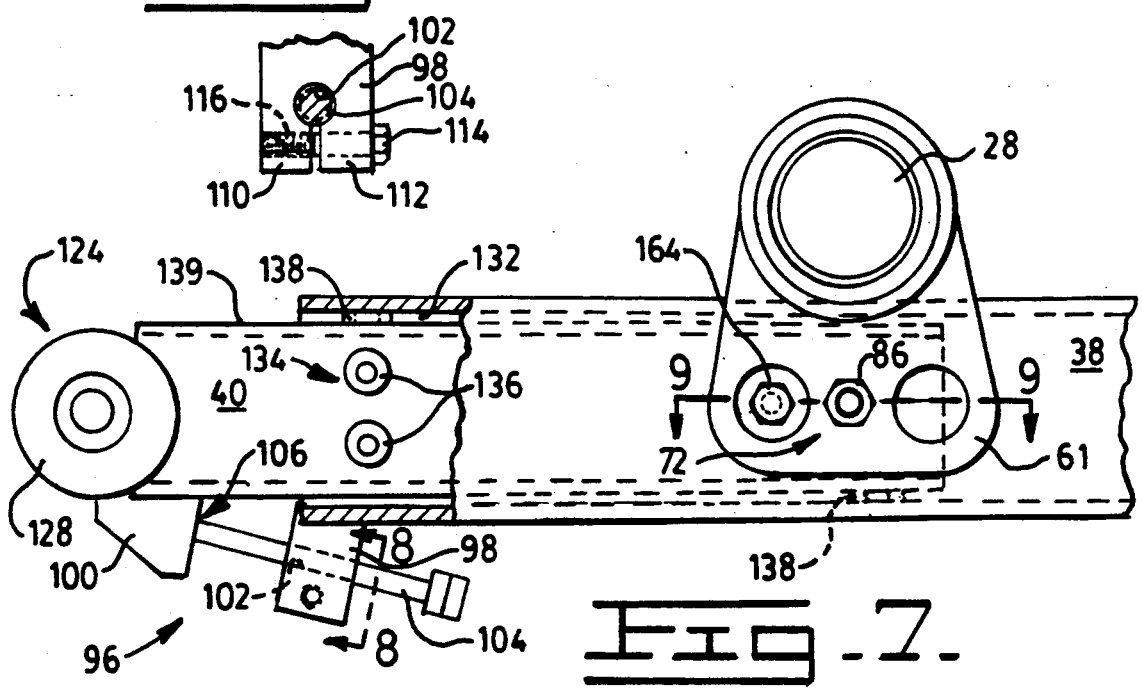

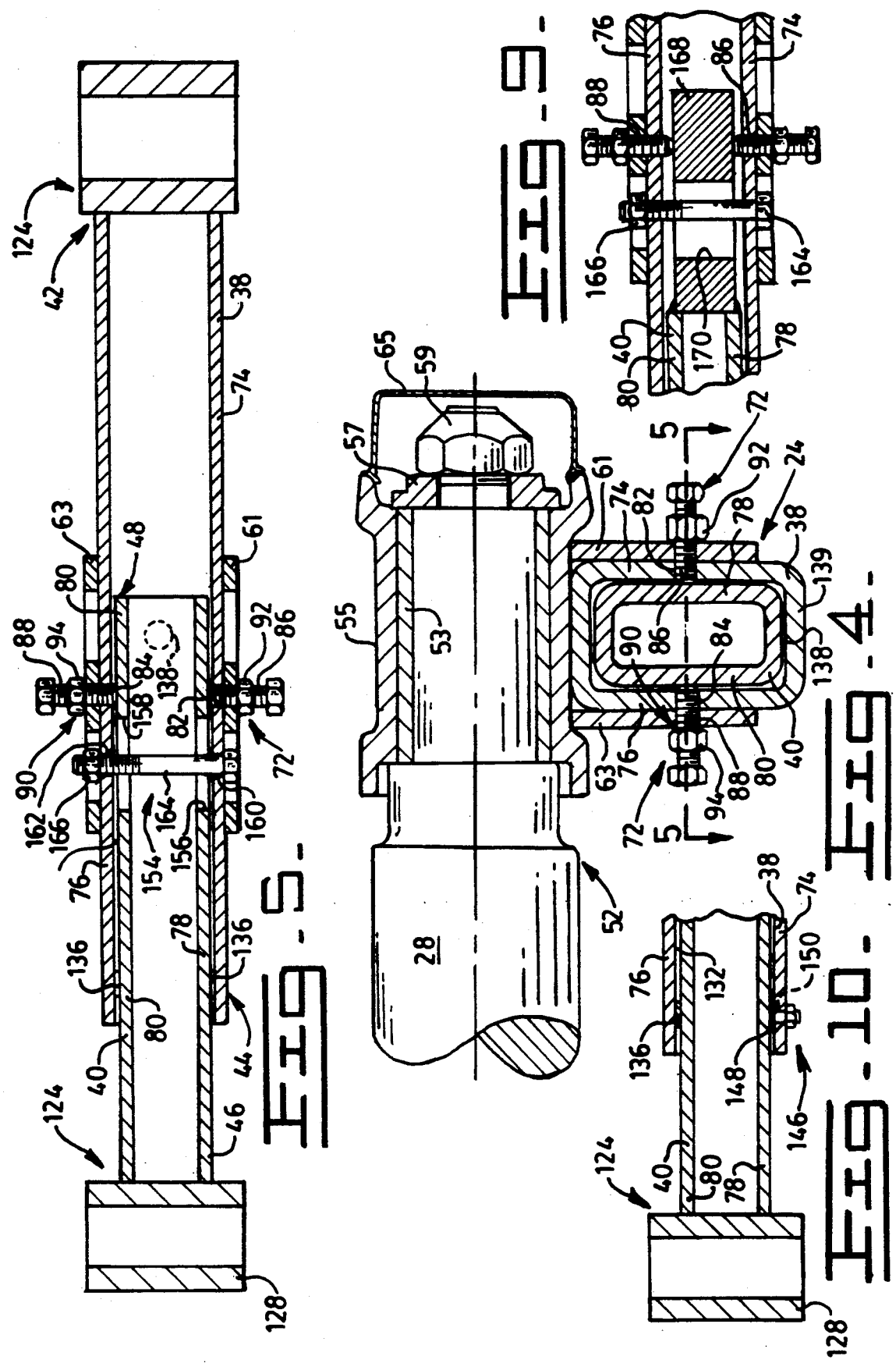

BELTED UNDERCARRIAGE ASSEMBLY

DESCRIPTION

1. Technical Field

This invention relates generally to a belted undercarriage assembly for a vehicle and more particularly to a belted undercarriage assembly having telescoping frames which provide apparatus and methods to control tension and lateral position of the belts.

2. Background Art

Track-type vehicles, utilizing self-laying endless track undercarriage, have advantages over wheel type vehicles by providing lower ground pressure and greater traction. In view of this, track-type vehicles can advantageously operate in wet soil areas and in dry sandy areas, such as deserts. The endless track undercarriage concept has been expanded by replacing the heavy metal track chain with a flexible belt arrangement. The belted undercarriage system offers several advantages over the metal track chain, including higher vehicle speed, less maintenance, simplicity of design, and the ability to travel on improved roadways.

However, because of the high speed operation of belted undercarriage vehicles, proper belt alignment is necessary to prevent heat buildup and rapid wear due to friction. Many belted undercarriage assemblies utilize pairs of spaced guide wheels and an endless belt having guide members adapted to fit between the spaced wheels and guide the belt. If the belt should run toward one side or the other, the guide members will continually contact one of the guide wheels and produce heat and wear due to the frictional contact. It is also important to maintain proper tension in the endless belt to prevent relative motion between the belt and the guide wheels.

One type of belted undercarriage for a vehicle is shown in U.S. Pat. No. 4,923,257, issued to R. J. Purcell on May 8, 1990. In this patent, belt alignment is accomplished by adding or removing one or more adjusting shims between bolted connecting joints of pivoting arms which connect to the wheel assemblies. While this adjustment method would appear to work effectively, it is time consuming and requires loose shim pieces to be stored somewhere. The belt tension is maintained by a plurality of pivoting arms and fluid actuated cylinders, with the load carried by the vehicle adding to the belt tension.

Another type of vehicle utilizing a belted undercarriage is shown in U.S. Pat. No. 4,681,177, issued to D. G. Zborowski on Jun. 21, 1987. In this patent, the endless belt is tensioned by a plurality of spring assemblies mounted between an axle and the vehicle frame. The spring assemblies pull on the axle to tension the belt. While this belt tensioning system appears to operate effectively, it does require a considerable number of components.

The present invention is directed to overcoming one or more of the problems as set forth above.

DISCLOSURE OF THE INVENTION

In one aspect of the present invention, a belted undercarriage assembly for a vehicle having a frame includes first and second endless belt assemblies with each assembly having first and second wheel units and an endless belt encircling the wheel units. The undercarriage assembly further includes first and second wheel supporting frame assemblies, each associated with a respective belt assembly, with each frame assembly including first and second rectangularly shaped tubes. One end of each tube is connected to one of the wheel units and the other end of each tube is adapted to be slideably positioned one within the other. A vehicle supporting axle is connected to the wheel supporting frame assemblies and also to the vehicle frame.

Vehicles utilizing flexible belted undercarriage assemblies offer advantages over wheel-type vehicles and also steel track-type vehicles. Such advantages would include low ground pressure, greater traction, less maintenance, lower noise levels, higher vehicle speeds, and the ability to travel on improved roadways. However, because of the high operating speed, maintaining proper belt alignment and tension is important to prevent heat buildup and accelerated wear due to friction of rubbing components.

The subject belted undercarriage assembly utilizes sliding telescopic rectangularly shaped tubes to connect and support the vehicle wheel assemblies. The sliding tubes provide belt adjustment and a threaded adjusting means provides tensioning and locking of the position of the tubes. An additional threaded adjusting means provides lateral belt adjustments.

BRIEF DESCRIPTION OF THE DRAWINGS

FIG. 1 is diagrammatic side elevational view of a vehicle which incorporates the belted undercarriage assembly of the present invention;

FIG. 2 is a diagrammatic end view, partly in section of the vehicle shown in FIG. 1, and taken generally along lines 2—2 of FIG. 1;

FIG. 3 is a diagrammatic sectional view taken generally along lines 3—3 of FIG. 1;

FIG. 4 is a diagrammatic enlarged view of the area indicated at 4 of FIG. 2;

FIG. 5 is a diagrammatic sectional view taken generally along lines 5—5 of FIG. 4;

FIG. 6 is a diagrammatic side elevational view of the wheel supporting tubes of the present invention with the tubes shown spaced one from the other;

FIG. 7 is a diagrammatic enlarged view, partly in section of the tubes shown in FIG. 6 with the tubes shown in sliding telescopic position;

FIG. 8 is a diagrammatic view taken generally along the lines 8—8 of FIG. 7;

FIG. 9 is a diagrammatic sectional view taken generally along the lines 9—9 of FIG. 7, and illustrating an alternate embodiment of one of the wheel supporting tubes; and FIG. 10 is a diagrammatic sectional view similar to a portion of FIG. 5, and illustrating an alternate embodiment of a means for maintaining a space configuration between the wheel supportion tubes of the present invention;

BEST MODE FOR CARRYING OUT THE INVENTION

Referring to the drawings, a trailer-type vehicle 10 has first and second side portions 12,14, and a frame 16. A belted undercarriage assembly 18 supports the vehicle 10 and includes first and second spaced apart substantially parallel endless belt assemblies 20,22, first and second wheel supporting frame assemblies 24,26, a single vehicle supporting axle 28, and resilient means 30 for connecting the axle 28 to the vehicle frame 16. Each of the endless belt assemblies 20,22 includes first and second spaced apart wheel units 32,34 and an endless substantially inextensible elastomeric belt 36 encircling the first and second wheel units 32,34. The first belt assembly 20 is positioned adjacent the first side portion 12 of the vehicle and the second belt assembly 22 is positioned adjacent the second side portion 14 of the vehicle 10. Each of the belts 36 includes a plurality of guide blocks 37.

Each of the first and second wheel supporting frame assemblies 24,26 is associated with respective first and second belt assemblies 20,22 and each of the frame assemblies 24,26 includes first and second substantially rectangular shaped tubes 38,40. The first tube 38 has first and second end portions 42,44, with the first end portion 42 being connected to the first wheel unit 32. The second tube 40 has first and second end portions 46,48, with the first end portion 46 being connected to the second wheel unit 34. The second end portion 48 of the second tube 40 is adapted to be slideably positioned within the second end portion 44 of the first tube 38. The telescopic arrangement of the first and second tubes 38,40 provides for controllable movement of the first end portion 46 of the second tube 40 toward and away from the first end portion 42 of the first tube 38.

The vehicle supporting axle 28 extends substantially transverse to the first and second belt assemblies 20,22 and has first and second end portions 50,52 which are connected to a respective first and second wheel supporting frame assembly 24,26. More specifically, the first and second axle end portions 50,52 are connected to the first tubes 38, one on each side of the vehicle 10, and at locations substantially midway between the first and second wheel units 32,34. With particular reference to FIG. 4, a bearing 53 and a sleeve 55 are connected to each end portion 50,52 of the axle 28 by a spacer 57 and a threaded nut 59. First and second plates 61,63 are adapted to connect, as by welding, the sleeve 55 to the first tube 38. A cover plate 65 is connected to the sleeve 55 and encloses the nut 59.

The resilient means 30 for connecting the axle 28 to the vehicle frame 16 includes first and second leaf spring units 54,56, first and second brackets 58,60 on each side of the vehicle frame 16, and first and second clamp assemblies 62,64. Each of the leaf spring units 54,56 has first and second end portions 66,68 and a middle portion 70. The first and second end portions 66,68 are connected to respective first and second brackets 58,60 and the clamp assemblies 62,64 connect the middle portions 70 to the axle 28.

With particular reference to FIGS. 2, 4, and 5, the undercarriage assembly 18 includes means 72 for controllably moving one of the first and second tubes 38,40 laterally relative to the other tube. Each of the first and second tubes 38,40 has respective first and second substantially parallel side walls 74,76 and 78,80. The first and second side walls 74,76 and the plates 61,63 define respective first and second threaded apertures 82,84. The means 72 for moving the second tube 40 relative to the first tube 38 includes first and second threaded fasteners 86,88 which are adapted to engage the respective first and second threaded apertures 82,84, and thread completely through the apertures 82,84 to bear against the respective side walls 78,80 of the second tube 40. By loosening one of the fasteners 86,88 and tightening the other of the fasteners 86,88, the second tube 40 is laterally movable with respect to the first tube 38. The threaded fasteners 86,88 are held in a particular position by locking means 90, which includes first and second lock nuts 92,94. The lock nuts 92,94 can be locked against the plates 61,63 to prevent either of the threaded fasteners 86,88 from moving linearly toward each other.

With particular reference to FIGS. 6, 7, and 8, the undercarriage assembly 18 further includes means 96 for controllably moving one of the first and second tubes 38,40 axially relative to the other tube. The means 96 includes first and second brackets 98,100 connected to the respective first and second tubes 38,40, a threaded bore 102 defined by the first bracket 98, and a threaded member 104 adapted to threadably engage the bore 102. The threaded member 104 has first and second end portions 106,108 with the first end portion 106 being adapted to bear against the second bracket 100. The second end portion 108 is formed to receive a tool or wrench for turning the threaded member. The first bracket 98 is split from the threaded bore 102 to the surface to provide first and second legs 110,112. A threaded fastener 114 is adapted to engage a threaded bore 116 in the first leg 110 and draw the first and second legs 110,112 together and clamp onto the threaded member 104.

Each of the wheel units 32,34 includes a spindle 11B, first and second spaced wheels 120,122, rotatably connected to a respective spindle 118, a resilient tire 123 mounted on each of the wheels 120,122, and means 124 for connecting each of the spindles to a respective first end portion 42,46 of the first and second tubes 38,40. The connecting means 124 includes first and second hubs 126,128 connected to the first end portions 42,46 of the tubes 38,40. A spindle 11B is positioned, as by a press fit, within each of the hubs 126,128. The first wheel unit 32 includes fluid operated wheel braking apparatus 130 associated with each of the wheels 120,122.

Referring particularly to FIGS. 5, 6, and 7, the second end portion 48 of the second tube 40, which is positioned within the second end portion 44 of the first tube 38, defines a space 132 between the tube portions 48,44, and means 134 controllably maintains the configuration of the space 132. The means 134 includes a plurality of spacing members 136, such as steel washers 136, which are connected to the first and second side walls 78,80. An additional spacing member 138 is connected to the bottom wall 139 of the second end portion 48 of the second tube 40.

With particular reference to FIG. 10, an alternate means 146 is shown for maintaining the configuration of the space 132. The means 146 includes one or more set screws 148 threaded into threaded holes 150 in the first side wall 74 of the first tube 38, and one or more lock nuts 152. After the second tube 40 is inserted into the first tube 38, the set screws 148 are tightened against the first side wall 78, which forces the spacing member 136 against the second side wall 76. This produces substantially a zero clearance between the first and second tubes 38,40 at this location. Once the set screws 148 are tightened, the lock nuts 152 are tightened against the first side wall 74 to hold the set screws 148 in place.

With reference to FIGS. 5, 6, 7, and 9, a means 154 for controllably limiting the axial movement of the second tube 40 relative to the first tube 38 is shown. The means 154 includes aligned elongated slots 156,158 through the respective sidewalls 78,80 of the second tube 40, aligned holes 160,162 in the respective sidewalls 74,76 of the first tube 38, and a securing member, such as a bolt 164, inserted through the holes 160,162 and the slots 156,158. A nut 166 secures the bolt 164 and prevents its removal. In the assembled telescopic condition of the first and second tubes 38,40, relative axial movement of the tubes 38,40 is limited by the elongated dimension of the slots 156,158. The tubes 38,40 cannot be separated without first removing the bolt 164. This arrangement prevents possible damage to the vehicle 10 if the belt 36 should break or accidentally come off of the wheel units 32,34. The above described structural arrangement also provides mobility of the vehicle 10 without the belts 36, traveling only on the tires 123.

With particular reference to FIG. 9, an alternate embodiment of the limiting means 154 is shown. In this embodiment, a bar 168 is connected to the second tube 40, with the bar 168 having a through slot 170 for receiving the bolt 164. The width of the bar 168 is less than the width of the second tube 40, which provides additional lateral adjustment of the second tube 40 by the threaded fasteners 86,88.

The vehicle 10 is adapted to transport various types of cargo, such as containers 140. When the vehicle 10 is not being towed, first and second supports 142,144 stabilize the vehicle 10.

Industrial Applicability

With reference to the drawings, the subject belted undercarriage assembly 18 is particularly useful for providing support and mobility for various types of vehicles, such as a trailer type vehicle 10. The vehicle 10 is adapted to transport any type of cargo, such as containers 140. The belted undercarriage assembly provides good traction and low ground pressure for advantageous operation of the vehicle in wet soil areas and in dry, sandy areas, such as deserts.

The telescopic relationship of the first and second tubes 38,40 provides easy installation, and removal, of the endless belts 36 onto the wheel units 32,34. The second tube 40 is inserted into the first tube 38 until the endless belt 36 will pass over the wheel units 32,34. The first and second tubes 38,40 are then forced apart by the threaded member 104 which bears against the second bracket 100. The preferred belt tension between the belts 36 and the tires 123 is achieved by tightening or loosening of the threaded member 104. Since the first and second wheel units 32,34 are connected to the respective first and second tubes 38,40, by way of the first and second hubs 126,128, movement of the first end portions 42,46 away from each other moves the wheel units 32,34 and tensions the belts 36. Prior to tightening or loosening of the threaded member 104, the threaded fastener 114 is loosened so the threaded member 104 can be turned. Once proper tension of the belt 36 has been achieved, the threaded fastener 114 is again tightened to prevent the threaded member 104 from turning.

In view of manufacturing tolerances associated with the belts 36, the wheels 120,122, the tires 123, and other undercarriage components, the belts 36 do not always run true with respect to the tires 123. Such misalignment can cause undesirable engagement of the guide members 37 with the tires 123. To prevent such engagement, the lateral adjustment means 72 is provided. To compensate for any misalignment and true up the belt 36, the first and second lock nuts 92,94 are loosened from engagement with the first and second plates 61,63. Depending upon which direction the belt 36 is to be moved, one of the first or second threaded fasteners 86,88 is loosened and the other is tightened against the sidewalls 78 or 80 of the tube 40. A small amount of movement of the threaded fasteners 86,88 produces movement of the tube 40, and thus the belt 36. Once the correct amount of adjustment has been made, the lock nuts 92,94 are again tightened against the plates 61,63 to prevent any unintentional movement of the threaded fasteners 86,88.

In view of the arrangement of the axle 28 with the first and second frame assemblies 24,26, the first and second wheel units 32,34, can oscillate about the axle 28.

Other aspects, objects, and advantages of this invention can be obtained from a study of the drawings, the disclosure and the appended claims.

We claim:

1. A belted undercarriage assembly for a vehicle having first and second side portions and a frame, comprising:

first and second spaced apart endless belt assemblies, each assembly including first and second wheel units and an endless elastomeric belt encircling said first and second wheel units, said first belt assembly being positioned adjacent said first side portion of said vehicle and said second belt assembly being positioned adjacent said second side portion of said vehicle;

first and second wheel supporting frame assemblies, each associated with respective first and second belt assemblies, each frame assembly including first and second tubes, each tube being of a substantially rectangular configuration, said first tube having a first end portion connected to said first wheel unit and said second tube having a first end portion connected to said second wheel unit, one of said first and second tubes having a portion positioned within the other, and one of said tubes first end portion being controllably movable toward and from the first end portion of the other tube;

a vehicle supporting axle having first and second end portions connected to a respective first and second wheel supporting frame assembly, at locations between each first and second wheel units; and means for connecting said axle first and second end portions to said vehicle frame.

2. A belted undercarriage assembly, as set forth in claim 1, including means for controllably, axially moving one of said first and second tubes relative to the other.

3. A belted undercarriage assembly, as set forth in claim 1, including means for controllably, laterally moving one of said first and second tubes relative to the other.

4. A belted undercarriage assembly, as set forth in claim 1, wherein each wheel unit includes a spindle, first and second spaced wheels rotatably connected to said spindle, a resilient tire mounted on each of said wheels, and means for connecting each of said spindles to a respective one of said first and second frame tubes.

5. A belted undercarriage assembly, as set forth in claim 1, including a hub connected to the first end portion of said first and second tubes, and a wheel supporting spindle positioned within each of said hubs.

6. A belted undercarriage assembly, as set forth in claim 1, wherein the portion of one tube positioned within the other defines a space between said tube portions and includes means for controllably maintaining the configuration of said space.

7. A belted undercarriage assembly, as set forth in claim 2, wherein said means for axially moving one of said first and second tubes relative to the other includes first and second brackets connected to respective first and second tubes, a threaded member having a first end portion, said first bracket defining a threaded bore, said bore being adapted to receive said threaded member, and said first end portion being adapted to bear against said second bracket.

8. A belted undercarriage assembly, as set forth in claim 3, wherein each of said first and second tubes has first and second substantially parallel side walls, said side walls of one of said first and second tubes defining respective first and second threaded apertures, and said means for moving one tube relative to the other tube includes first and second threaded shafts adapted to engage respective first and second threaded apertures and to bear against respective first and second side walls of said other tube.

9. A belted undercarriage assembly, as set forth in claim 1, wherein said axle first and second end portions are connected to a respective one of said first and second tubes.

10. A belted undercarriage assembly, as set forth in claim 6, wherein said means for maintaining the configuration of said space includes at least one spacing member connected to the portion of one of said first and second tubes inserted within the other, and at least one threaded member threadably engaged with said first tube.

11. A belted undercarriage assembly, as set forth in claim 6 wherein id for maintaining the configuration of said space includes a plurality of spacing members connected to the portion of one of said first and second tubes inserted within the other.

12. A belted undercarriage assembly, as set forth in claim 8, including means for locking said first threaded shaft from linear movement toward said second threaded shaft.

13. A belted undercarriage assembly for a vehicle having a frame comprising:

first and second substantially parallel endless belt assemblies, each assembly including first and second spaced apart wheel units and an endless substantially inextensible belt encircling said first and second wheel units;

first and second support frame assemblies, each associated with respective said first and second belt assemblies, each frame assembly including first and second tubes, said first tube having first and second end portions, said first end portion being connected to said first wheel unit, said second tube having first and second end portions, said first end portion being connected to said second wheel unit, said second end portions of said first and second tubes being positioned one within the other;

a vehicle supporting axle having first and second end portions connected to respective first and second frame assemblies, said axle extending substantially transverse to the first and second belt assemblies and said end portions being positioned substantially midway between respective first and second wheel units;

means for connecting said axle to said vehicle frame; and means for axially moving one of said first and second tubes with respect to the other.

14. An undercarriage assembly for a work vehicle having first and second side portions and a frame, comprising:

first and second wheel units positioned adjacent each of said side portions, each wheel unit including a spindle, first and second spaced wheels rotatably connected to said spindle, and a resilient tire mounted on each of said wheels;

first and second wheel supporting frame assemblies, each frame assembly including first and second rectangular shaped tubes, each tube having a first end portion connected to respective first and second wheel units, each tube further having first and second side walls and a second end portion, the second end portion of one tube being adapted to be slideably positioned within the second end portion of said other tube;

a single vehicle supporting axle having first and second end portions connected to respective first and second wheel supporting frame assemblies;

means for connecting said axle to said vehicle frame; and means for controllably limiting the axial movement of one of said first and second tubes relative to the other.

15. An undercarriage assembly, as set forth in claim 14, wherein said means for limiting the axial movement of one of said tubes includes aligned elongated slots through the side walls of said second tube and a securing member inserted through the side walls of said first tube and through said slots.

* * * * *